(12) United States Patent
Tsai et al.

(10) Patent No.: US 11,973,425 B2
(45) Date of Patent: Apr. 30, 2024

(54) RAMP GENERATION IN BUCK CONVERTERS

(71) Applicant: NOVATEK Microelectronics Corp., Hsinchu (TW)

(72) Inventors: Chieh-Ju Tsai, Kinmen County (TW); Ching-Jan Chen, Taipei (TW); Zhen-Guo Ding, Hsinchu County (TW); Zhe-Hui Lin, Hsinchu County (TW); Wei-Ling Chen, Hsinchu County (TW)

(73) Assignee: NOVATEK Microelectronics Corp., Hsinchu (TW)

( * ) Notice: Subject to any disclaimer, the term of this patent is extended or adjusted under 35 U.S.C. 154(b) by 163 days.

(21) Appl. No.: 17/646,478

(22) Filed: Dec. 29, 2021

(65) Prior Publication Data
US 2022/0271661 A1  Aug. 25, 2022

Related U.S. Application Data

(60) Provisional application No. 63/152,323, filed on Feb. 22, 2021.

(51) Int. Cl.
*H02M 3/157* (2006.01)
*H02M 1/00* (2006.01)
*H02M 3/158* (2006.01)

(52) U.S. Cl.
CPC ......... *H02M 3/158* (2013.01); *H02M 1/0025* (2021.05); *H02M 3/157* (2013.01)

(58) Field of Classification Search
CPC ........................................... H02M 3/155–1588
See application file for complete search history.

(56) References Cited

U.S. PATENT DOCUMENTS

| | | | |
|---|---|---|---|
| 7,245,113 B2 | 7/2007 | Chen et al. | |
| 7,751,471 B2 | 7/2010 | Chu et al. | |
| 9,601,997 B2 | 3/2017 | Yan et al. | |
| 10,097,079 B1 | 10/2018 | Cheng et al. | |
| 10,833,661 B1 * | 11/2020 | Archibald | H03K 3/037 |
| 2010/0007318 A1 | 1/2010 | Faerber | |
| 2014/0292300 A1 | 10/2014 | Yan et al. | |
| 2015/0137776 A1 | 5/2015 | Thomas et al. | |
| 2019/0260284 A1 | 8/2019 | Inc | |
| 2020/0228018 A1 | 7/2020 | Wiktor et al. | |
| 2021/0045212 A1 | 2/2021 | Lai et al. | |

FOREIGN PATENT DOCUMENTS

| | | |
|---|---|---|
| EP | 0709948 A1 | 5/1996 |
| EP | 2985900 A1 | 2/2016 |
| TW | 201214935 A | 4/2012 |
| TW | 201328141 A | 7/2013 |
| TW | I547083 B | 8/2016 |
| TW | 201909536 A | 3/2019 |
| TW | 202030959 A | 8/2020 |

* cited by examiner

*Primary Examiner* — Peter M Novak
(74) *Attorney, Agent, or Firm* — CKC & Partners Co., LLC

(57) ABSTRACT

A power converter includes a power stage circuit, a ramp generator circuit, and a control circuit. The power stage circuit generates an output signal according to an input signal and a control signal. The ramp generator circuit generates a ramp signal according to the control signal, the input signal, and the output signal. The control circuit generates the control signal according to the output signal, a reference signal, and the ramp signal.

17 Claims, 8 Drawing Sheets

RAMP GENERATION IN BUCK CONVERTERS

RELATED APPLICATIONS

This application claims priority to U.S. Provisional Application Ser. No. 63/152,323, filed Feb. 22, 2021, which is herein incorporated by reference.

BACKGROUND

Technical Field

The present disclosure relates to power converting technology. More particularly, the present disclosure relates to a power converter and a converting method.

Description of Related Art

With development of technology, various power converters have been applied to various circuitry. A power converter has a control circuit for generating a pulse width modulation signal based on a feedback signal related to an output signal that the power converter outputs. The power converter also has a ramp generator circuit for generating a ramp signal, and the control circuit adjusts the duty of the pulse width modulation signal according to the ramp signal. In some related approaches, the ramp generator circuit is implemented by active elements and does not utilize the output signal to generate the ramp signal. Thus, the output impedance of the power converters in these related approaches is higher such that the transient response of the power converters is poor.

SUMMARY

Some aspects of the present disclosure provide a power converter. The power converter includes a power stage circuit, a ramp generator circuit, and a control circuit. The power stage circuit is configured to generate an output signal according to an input signal and a control signal. The ramp generator circuit is configured to generate a ramp signal according to the control signal, the input signal, and the output signal. The control circuit is configured to generate the control signal according to the output signal, a reference signal, and the ramp signal.

Some aspects of the present disclosure provide a converting method. The converting method includes following operations: generating, by a power stage circuit, an output signal according to an input signal and a control signal; generating, by a ramp generator circuit, a ramp signal according to the control signal, the input signal, and the output signal; and generating, by a control circuit, the control signal according to the output signal, a reference signal, and the ramp signal.

BRIEF DESCRIPTION OF THE DRAWINGS

The disclosure can be more fully understood by reading the following detailed description of the embodiment, with reference made to the accompanying drawings as follows.

DETAILED DESCRIPTION

In the present disclosure, "connected" or "coupled" may refer to "electrically connected" or "electrically coupled." "Connected" or "coupled" may also refer to operations or actions between two or more elements.

Figure 1:
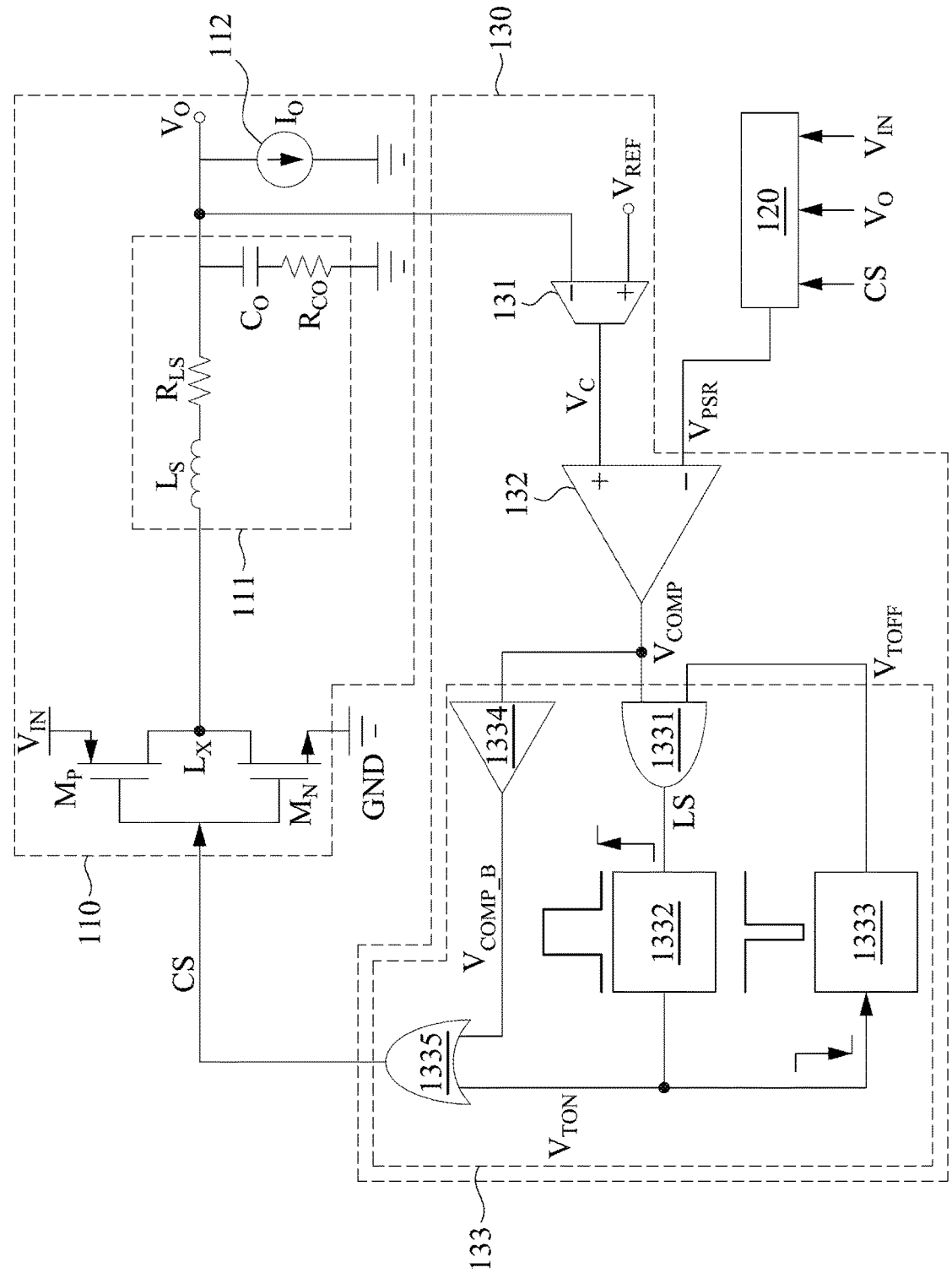
FIG. 1 is a schematic diagram illustrating a power converter according to some embodiments of the present disclosure.

Reference is made to FIG. 1. FIG. 1 is a schematic diagram illustrating a power converter 100 according to some embodiments of the present disclosure.

As illustrated in FIG. 1, the power converter 100 includes a power stage circuit 110, a ramp generator circuit 120, and a control circuit 130. The power stage circuit 110 is coupled to the ramp generator circuit 120 and the control circuit 130. The ramp generator circuit 120 is coupled to the control circuit 130.

The control circuit 130 is configured to generate a control signal CS, which is a pulse width modulation (PWM) signal. The power stage circuit 110 is configured to generate an output signal $V_O$ according to an input signal $V_{IN}$ and the control signal CS. As illustrated in FIG. 1, the power stage circuit 110 includes a switch $M_P$, a switch $M_N$, a filter circuit 111, and a load 112.

A first terminal of the switch $M_P$ is configured to receive the input signal $V_{IN}$, a second terminal of the switch $M_P$ is coupled to the node $L_x$ and a control terminal of the switch $M_P$ is configured to receive the control signal CS. A first terminal of the switch $M_N$ is coupled to a ground terminal GND, a second terminal of the switch $M_N$ is coupled to the node $L_x$, and a control terminal of the switch $M_N$ is configured to receive the control signal CS. The control signal CS is used to control the switch $M_P$ and the switch $M_N$ to be turned on or turned off. For example, when the control signal CS has a first logic level (e.g., high logic level), the switch $M_P$ is turned off and the switch $M_N$ is turned on, and a voltage at the node $L_x$ is generated in response to the input signal $V_{IN}$. When the control signal CS has a second logic level (e.g., low logic level), the switch $M_P$ is turned on and the switch $M_N$ is turned off, and the voltage at the node $L_x$ is generated in response to a ground voltage at the ground terminal GND.

The filter circuit 111 is coupled to the node $L_x$ and is configured to output the output signal $V_O$. To be more specific, the filter circuit 111 includes an inductor $L_S$, a resistor $R_{LS}$, a capacitor $C_O$, and a resistor $R_{CO}$. A first terminal of the inductor $L_S$ is coupled to the node $L_x$ and a second terminal of the inductor $L_S$ is coupled to a first terminal of the resistor $R_{LS}$. A second terminal of the resistor $R_{LS}$ is configured to output the output signal $V_O$ and is coupled to a first terminal of the capacitor $C_O$. A second terminal of the capacitor $C_O$ is coupled to a first terminal of the resistor $R_{LS}$, and a second terminal of the resistor $R_{LS}$ is coupled to the ground GND.

As described above, the control signal CS is used to control the switch $M_P$ and the switch $M_N$ to be turned on or turned off. In other words, a duty cycle of the control signal CS can determine turned-on time of the switch $M_P$ and turned-on time of the switch $M_N$ so as to output the output signal $V_O$. The output signal $V_O$ is substantially equal to a product of the input signal $V_{IN}$ and the duty cycle (e.g., 30%) of the control signal CS.

The ramp generator circuit 120 is configured to generate a ramp signal $V_{PSR}$ according to the control signal CS, the input signal $V_{IN}$, and the output signal $V_O$.

The control circuit 130 is configured to generate the control signal CS according to the output signal $V_O$, a reference signal $V_{REF}$, and the ramp signal $V_{PSR}$. As illustrated in FIG. 1, the control circuit 130 includes an error amplifier circuit 131, a comparator circuit 132, and a control signal generator circuit 133.

A first input terminal of the error amplifier circuit 131 is configured to receive the output signal $V_O$, and a second input terminal of the error amplifier circuit 131 is configured to receive the reference signal $V_{REF}$. The error amplifier circuit 131 generates an error amplifying signal $V_O$ according to the output signal $V_O$ and the reference signal $V_{REF}$.

A first input terminal of the comparator circuit 132 is configured to receive the error amplifying signal $V_O$, and a second input terminal of the comparator circuit 132 is configured to receive the ramp signal $V_{PSR}$. The comparator circuit 132 compares the error amplifying signal $V_O$ with the ramp signal $V_{PSR}$ to generate a comparison signal $V_{COMP}$.

The control signal generator circuit 133 generates the control signal CS according to the comparison signal $V_{COMP}$. To be more specific, the control signal generator circuit 133 includes an AND gate 1331, an on-time controller 1332, an off-time controller 1333, a delay circuit 1334, and an OR gate 1335.

A first input terminal of the AND gate 1331 is configured to receive the comparison signal $V_{COMP}$, and a second input terminal of the AND gate 1331 is configured to receive an off-time control signal $V_{TOFF}$. The AND gate 1331 performs an AND operation on the comparison signal $V_{COMP}$ and the off-time control signal $V_{TOFF}$ to generate a logic signal LS.

The on-time controller 1332 is configured to receive the logic signal LS and generate an on-time control signal $V_{TON}$ according to the logic signal LS. The on-time controller 1332 is triggered by rising edges and can determine a width of a logic value 1.

In addition, the off-time controller 1333 is configured to receive the on-time control signal $V_{TON}$ and generate an off-time control signal $V_{TOFF}$ according to the on-time control signal $V_{TON}$. The off-time controller 1333 is triggered by falling edges and can determine a width of a logic value 0.

The delay circuit 1334 is configured to receive the comparison signal $V_{COMP}$ and delay the comparison signal $V_{COMP}$ for a delay time to generate a delay signal $V_{COMP\_B}$. The delay circuit 1334 can prevent noise.

A first input terminal of the OR gate 1335 is configured to receive the delay signal $V_{COMP\_B}$, and a second input terminal of the OR gate 1335 is configured to receive the on-time control signal $V_{TON}$. The OR gate 1335 performs an OR operation on the delay signal $V_{COMP\_B}$ and the on-time control signal $V_{TON}$ to generate the control signal CS.

The implementations and operations of the ramp generator circuit 120 will be described in following paragraphs.

Figure 2:
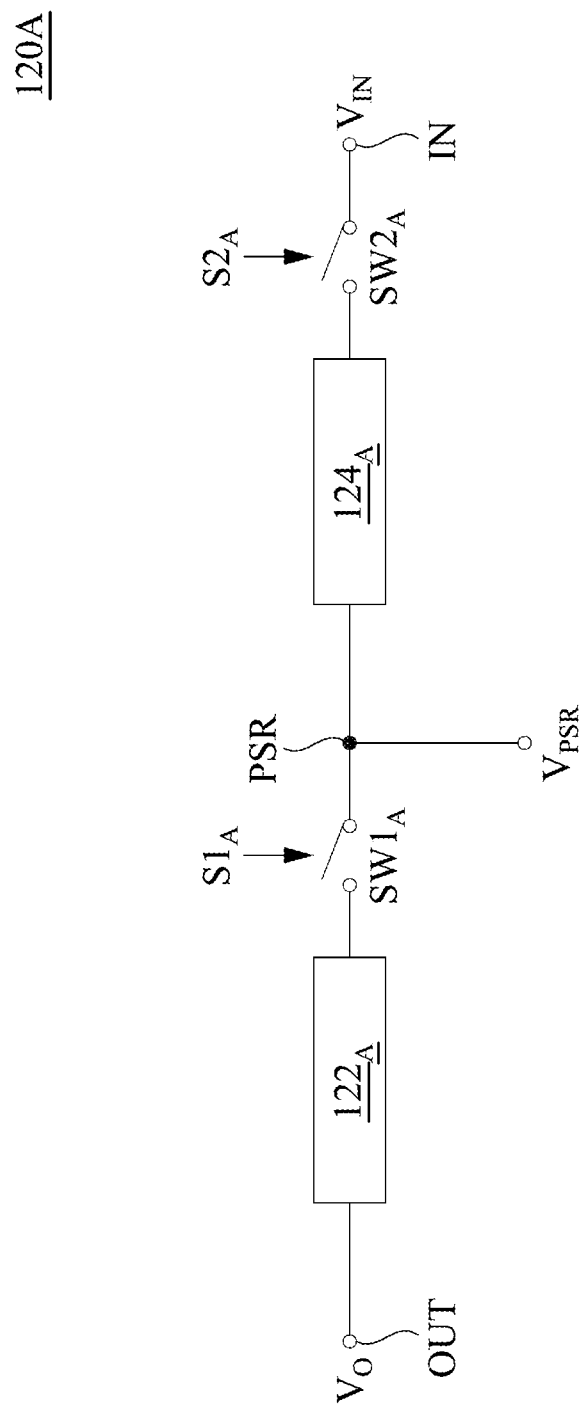
FIG. 2 is a schematic diagram illustrating a ramp generator circuit according to some embodiments of the present disclosure.

Reference is made to FIG. 2. FIG. 2 is a schematic diagram illustrating a ramp generator circuit 120A according to some embodiments of the present disclosure. In some embodiments, the ramp generator circuit 120 in FIG. 1 is implemented by the ramp generator circuit 120A in FIG. 2.

As illustrated in FIG. 2, the ramp generator circuit 120A includes an impedance circuit $122_A$, a switch $SW1_A$, an impedance circuit $124_A$, and a switch $SW2_A$. The impedance circuit $122_A$ is coupled between an output node OUT and the switch $SW1_A$ and configured to receive the output signal $V_O$ from the output node OUT. The switch $SW1_A$ is coupled between the impedance circuit $122_A$ and a ramp generation node PSR. The impedance circuit $124_A$ is coupled between the ramp generation node PSR and the switch $SW2_A$. The switch $SW2_A$ is coupled between the impedance circuit $124_A$ and an input node IN and configured to receive the input signal $V_{IN}$ from the input node IN. The switch $SW1_A$ is controlled by a control signal $S1_A$, and the switch $SW2_A$ is controlled by a control signal $S2_A$. The ramp signal $V_{PSR}$ is generated at the ramp generation node PSR.

Figure 3:
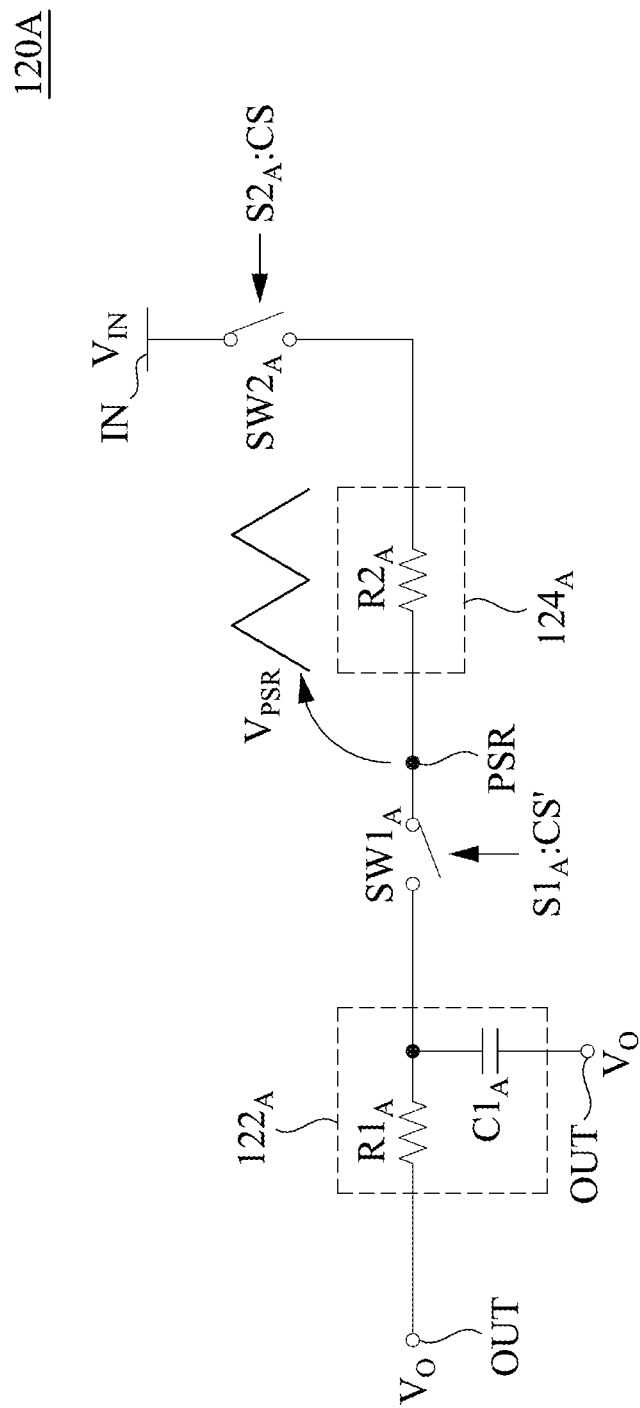
FIG. 3 is a schematic diagram illustrating the ramp generator circuit in FIG. 2 with a first operation according to some embodiments of the present disclosure.

Reference is made to FIG. 3. FIG. 3 is a schematic diagram illustrating the ramp generator circuit 120A in FIG. 2 with a first operation according to some embodiments of the present disclosure.

As illustrated in FIG. 3, the impedance circuit $122_A$ includes a resistor $R1_A$ and a capacitor $C1_A$. The impedance circuit $124_A$ includes a resistor $R2_A$. In other words, the impedance circuit $122_A$ and the impedance circuit $124_A$ are formed by passive elements, and at least one of the impedance circuit $122_A$ and the impedance circuit $124_A$ includes a capacitor. The resistor $R1_A$ and the capacitor $C1_A$ are coupled in parallel. To be more specific, a first terminal of the resistor $R1_A$ and a first terminal of the capacitor $C1_A$ are coupled to the output terminal OUT, and a second terminal of the resistor $R1_A$ and a second terminal of the capacitor $C1_A$ are coupled to the switch $SW1_A$. A first terminal of the resistor $R2_A$ is coupled to the ramp generation node PSR, and a second terminal of the resistor $R2_A$ is coupled to the switch $SW2_A$.

In the example of FIG. 3, the control signal CS generated from the control circuit 130 in FIG. 1 is uses as the control signal $S2_A$, and the control signal $S2_A$ is configured to turn on or turn off the switch $SW2_A$. In addition, a complementary control signal CS' which is a complementary of the control signal CS is used as the control signal $S1_A$, and the control signal $S1_A$ is configured to turn on or turn off the switch $SW1_A$. In other words, when the switch $SW2_A$ is turned on, the switch $SW1_A$ is turned off. In another embodiment, the control signal CS is used as the control signal $S1_A$, and the complementary of the control signal CS is used as the control signal $S2_A$.

Figure 4:
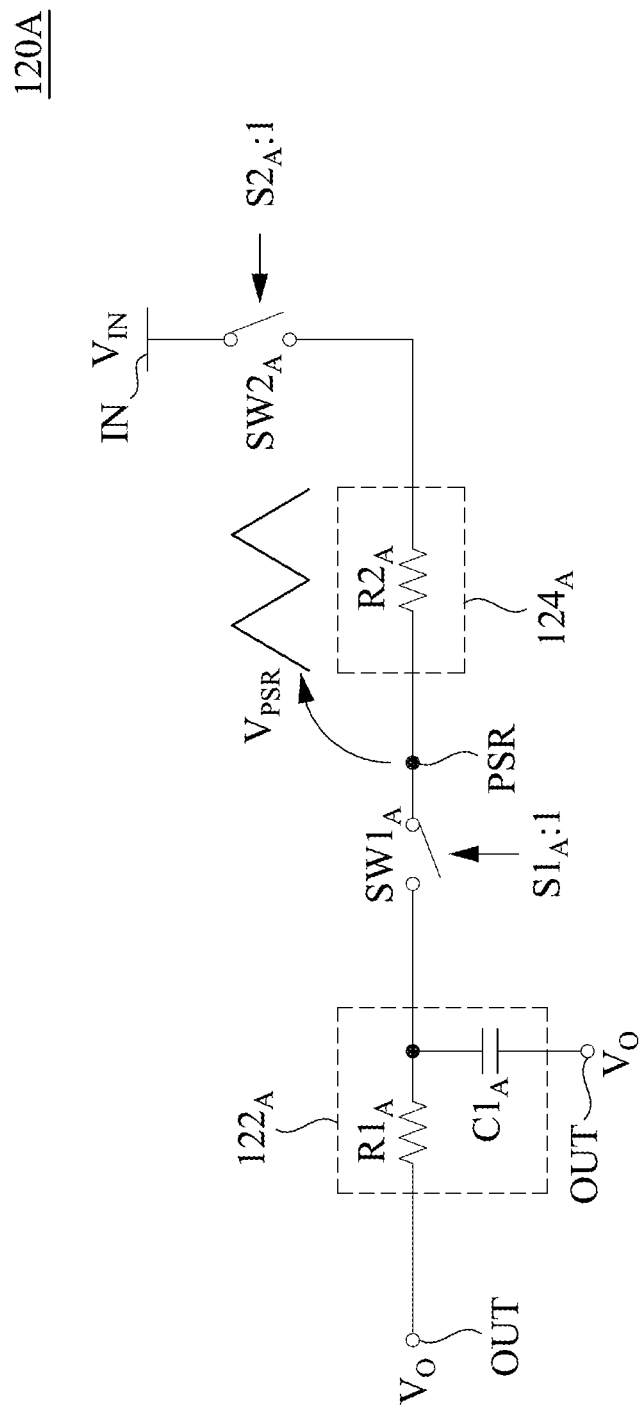
FIG. 4 is a schematic diagram illustrating the ramp generator circuit in FIG. 2 with a second operation according to some embodiments of the present disclosure.

Reference is made to FIG. 4. FIG. 4 is a schematic diagram illustrating the ramp generator circuit 120A in FIG. 2 with a second operation according to some embodiments of the present disclosure.

In the example of FIG. 4, the switch $SW1_A$ and the switch $SW2_A$ are turned on during a same time period. For example, if the switch $SW1_A$ and the switch $SW2_A$ are implemented by N-type transistors, both of the control signal $S1_A$ and the control signal $S2_A$ have a logic value 1 during the same time period, and the switch $SW1_A$ and the switch $SW2_A$ are turned on by the control signal $S1_A$ and the control signal $S2_A$ with the logic value 1 respectively.

Figure 5:
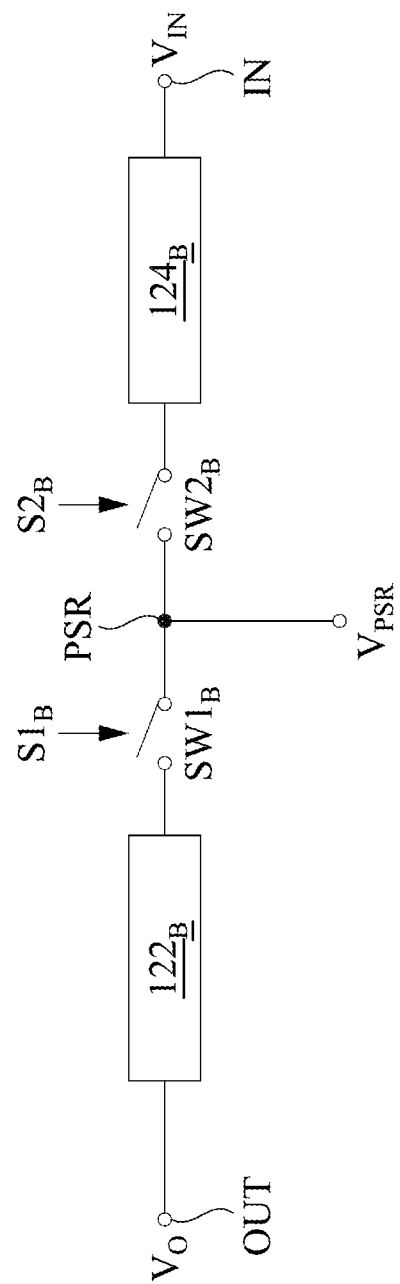
FIG. 5 is a schematic diagram illustrating a ramp generator circuit according to some embodiments of the present disclosure.

Reference is made to FIG. 5. FIG. 5 is a schematic diagram illustrating a ramp generator circuit 120B according to some embodiments of the present disclosure. In some embodiments, the ramp generator circuit 120 in FIG. 1 is implemented by the ramp generator circuit 120B in FIG. 5.

As illustrated in FIG. 5, the ramp generator circuit 120B includes an impedance circuit $122_B$, a switch $SW1_B$, an impedance circuit $124_B$, and a switch $SW2_B$. The impedance circuit $122_B$ is coupled between an output node OUT and the switch $SW1_B$ and configured to receive the output signal $V_O$ from the output node OUT. The switch $SW1_B$ is coupled between the impedance circuit $122_B$ and the ramp generation node PSR. The switch $SW2_B$ is coupled between the ramp generation node PSR and the impedance circuit $124_8$. The impedance circuit $124_B$ is coupled between the switch $SW2_B$ and an input node IN and configured to receive the input signal $V_{IN}$ from the input node IN. The switch $SW1_B$ is controlled by a control signal $S1_B$, and the switch $SW2_B$ is controlled by a control signal $S2_B$. The ramp signal $V_{PSR}$ is generated at the ramp generation node PSR.

Figure 6:
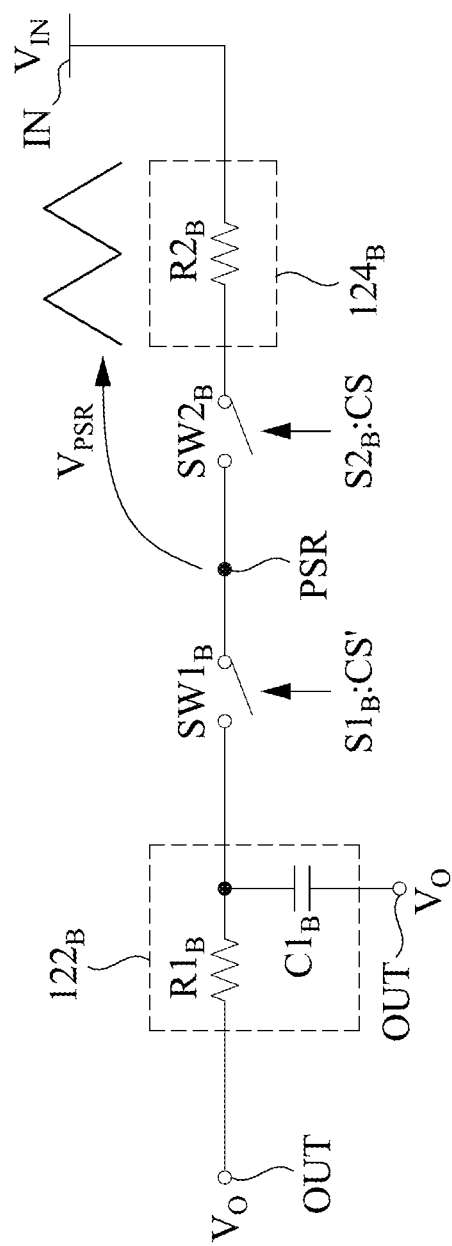
FIG. 6 is a schematic diagram illustrating the ramp generator circuit in FIG. 5 with a first operation according to some embodiments of the present disclosure.

Reference is made to FIG. 6. FIG. 6 is a schematic diagram illustrating the ramp generator circuit 120B in FIG. 5 with a first operation according to some embodiments of the present disclosure.

As illustrated in FIG. 6, the impedance circuit $122_B$ includes a resistor $R1_B$ and a capacitor $C1_B$. The impedance circuit $124_B$ includes a resistor $R2_B$. In other words, the impedance circuit $122_B$ and the impedance circuit $124_B$ are formed by passive elements, and at least one of the impedance circuit $122_B$ and the impedance circuit $124_B$ includes a capacitor. The resistor $R1_B$ and the capacitor $C1_B$ are coupled in parallel. To be more specific, a first terminal of the resistor $R1_B$ and a first terminal of the capacitor $C1_B$ are coupled to the output terminal OUT, and a second terminal of the resistor $R1_B$ and a second terminal of the capacitor $C1_B$ are coupled to the switch $SW1_B$. A first terminal of the resistor $R2_B$ is coupled to the switch $SW2_B$, and a second terminal of the resistor $R2_B$ is coupled to the input terminal IN.

In the example of FIG. 6, is the control signal CS generated from the control circuit 130 in FIG. 1 is used as the control signal $S2_B$, and the control signal $S2_B$ is configured to turn on or turn off the switch $SW2_B$. In addition, a complementary control signal CS' which is a complementary of the control signal CS is used as the control signal $S1_B$, and the complementary control signal CS' is configured to turn on or turn off the switch $SW1_B$. In other words, when the switch $SW2_B$ is turned on, the switch $SW1_B$ is turned off. In another embodiment, the control signal CS is used as the control signal $S1_B$, and the complementary of the control signal CS is used as the control signal $S2_B$.

Figure 7:
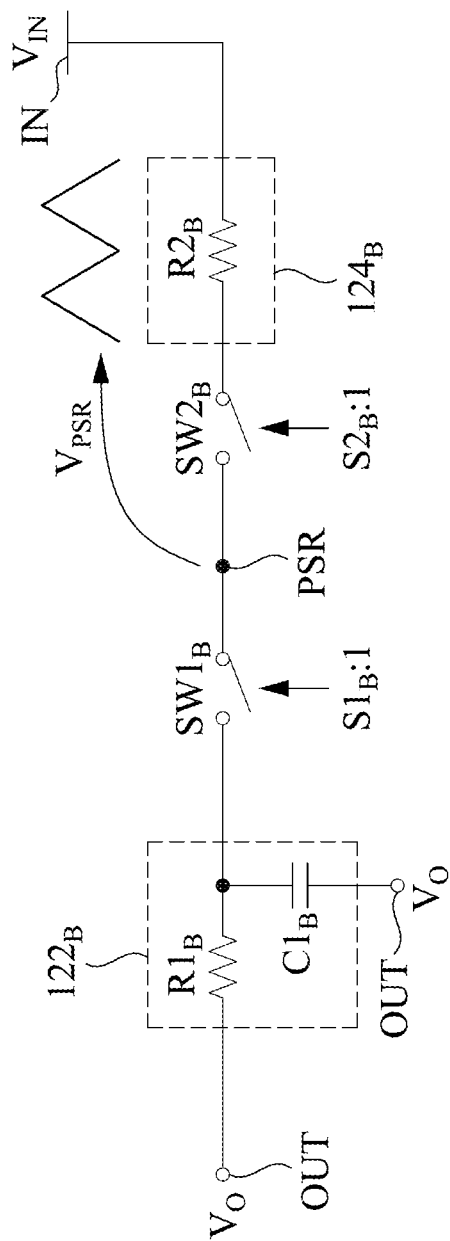
FIG. 7 is a schematic diagram illustrating the ramp generator circuit in FIG. 5 with a second operation according to some embodiments of the present disclosure.

Reference is made to FIG. 7. FIG. 7 is a schematic diagram illustrating the ramp generator circuit 120B in FIG. 5 with a second operation according to some embodiments of the present disclosure.

In the example of FIG. 7, the switch $SW1_B$ and the switch $SW2_B$ are turned on during a same time period. For example, if the switch $SW1_B$ and the switch $SW2_B$ are implemented by N-type transistors, both of the control signal $S1_B$ and the control signal $S2_B$ have a logic value 1 during the same time period, and the switch $SW1_B$ and the switch $SW2_B$ are turned on by the control signal $S1_B$ and the control signal $S2_B$ with the logic value 1 respectively.

In some conventional approaches, ramp generator circuits are implemented by circuits of active elements and do not utilize the output signal to generate the ramp signal. Thus, the output impedance of the power converters in these related approaches is higher such that the transient response of the power converters is poor.

Compared to the aforementioned conventional approaches, the ramp generator circuit 120 in the present disclosure is implemented by passive impedance circuit (without amplifying operation, without voltage-voltage conversion operation, without voltage-current conversion operation) and utilizes the output signal $V_O$ to generate the ramp signal $V_{PSR}$. Thus, the power converter 100 has a better transient response and low power consumption. Then, the control circuit 130 can detect the output signal $V_O$ to generate the error amplifying signal $V_C$, and then extend on-time of the logic signal LS to generate the control signal CS so as to control the switches $M_P$ and $M_N$.

Figure 8:
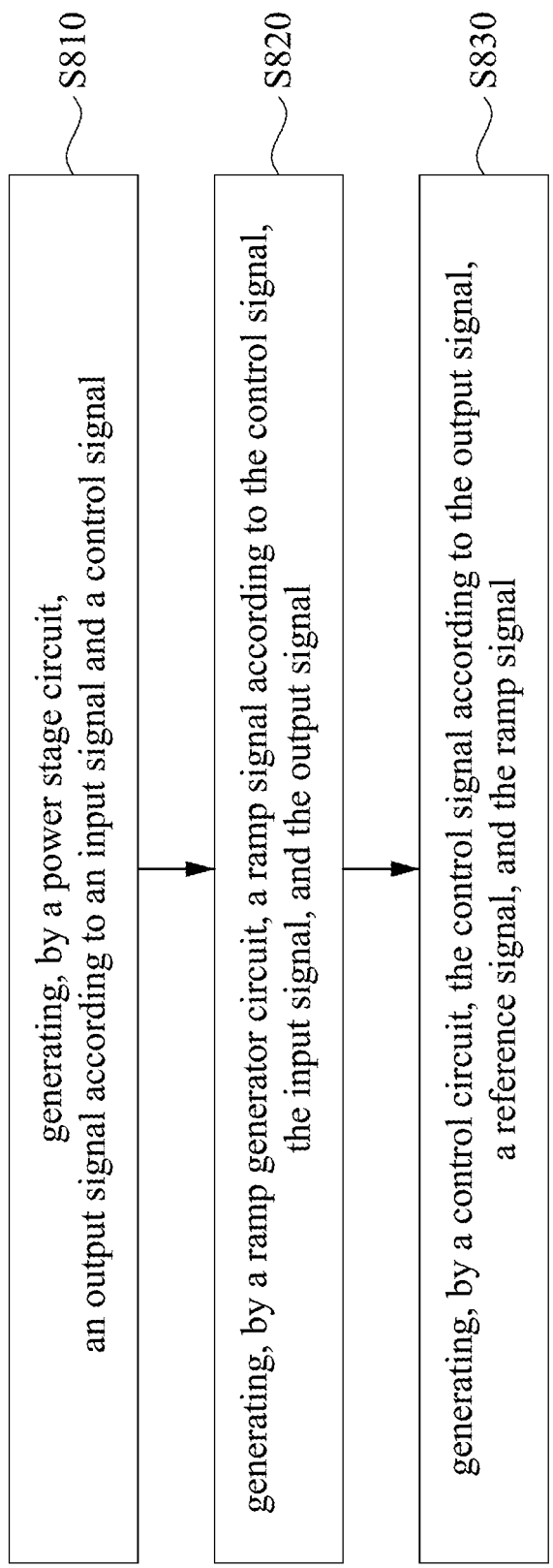
FIG. 8 is a schematic diagram illustrating a converting method according to some embodiments of the present disclosure.

Reference is made to FIG. 8. FIG. 8 is a schematic diagram illustrating a converting method 800 according to some embodiments of the present disclosure. The converting method 800 includes operations S810, S820, and S830. In some embodiments, the converting method 800 can be applied to the power converter 100 in FIG. 1, but the present disclosure is not limited thereto. For better understanding, the converting method 800 is described with FIG. 1 in following paragraphs.

In operation S810, the power stage circuit 110 generates the output signal $V_O$ according to the input signal $V_{IN}$ and the control signal CS. As illustrated in FIG. 1, the control signal CS can turn on of turn off the switch $M_P$ and the switch $M_N$ to control the voltage at the node $L_X$ in response the duty cycle of the control signal CS. Then, the filter circuit 111 can generate the output signal $V_O$ according to the voltage at the node $L_X$.

In operation S820, the ramp generator circuit 120 generates the ramp signal $V_{PSR}$ according to the control signal CS, the input signal $V_{IN}$, and the output signal $V_O$. The ramp generator circuit 120 can be implemented by the ramp generator circuit 120A in FIG. 2 or by the ramp generator circuit 120B in FIG. 5 to generate the ramp signal $V_{PSR}$.

In operation S830, the control circuit 130 generates the control signal CS according to the output signal $V_O$, the reference signal $V_{REF}$, and the ramp signal $V_{PSR}$. As illustrated in FIG. 1, the error amplifier circuit 131 generates the error amplifying signal $V_O$ according to the output signal $V_O$ and the reference signal $V_{REF}$. The comparator circuit 132 compares the error amplifying signal $V_O$ with the ramp signal $V_{PSR}$ to generate the comparison signal $V_{COMP}$. The control signal generator circuit 133 generates the control signal CS according to the comparison signal $V_{COMP}$.

Based on the descriptions above, the power converter in the present disclosure has a better transient response and low power consumption.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A power converter, comprising:
 a power stage circuit configured to generate an output signal according to an input signal and a control signal;
 a ramp generator circuit configured to generate a ramp signal according to the control signal, the input signal, and the output signal, and comprising:

a first impedance circuit coupled between an output node and a ramp generation node;

a second impedance circuit coupled between an input node and the ramp generation node;

a first switch coupled between the first impedance circuit and the ramp generation node; and a second switch coupled between the second impedance circuit and the ramp generation node or between the second impedance circuit and the input node; and a control circuit configured to generate the control signal according to the output signal, a reference signal, and the ramp signal.

2. The power converter of claim 1, wherein the ramp signal is generated at the ramp generation node.

3. The power converter of claim 1, wherein the first switch and the second switch are controlled to be turned on during a same time period.

4. The power converter of claim 1, wherein one of the first switch and the second switch is controlled by the control signal, the other is controlled by a complementary control signal, and the complementary control signal is a complementary of the control signal.

5. The power converter of claim 2, wherein one of the first impedance circuit and the second impedance circuit comprises a capacitor.

6. The power converter of claim 5, wherein the first impedance circuit comprises a first resistor and the capacitor which are coupled in parallel.

7. The power converter of claim 6, wherein the second impedance circuit comprises a second resistor.

8. The power converter of claim 1, wherein the control circuit comprises:

an error amplifier circuit configured to generate an error amplifying signal according to the output signal and the reference signal;

a comparator circuit configured to generate a comparison signal according to the error amplifying signal and the ramp signal; and a control signal generator circuit configured to generate the control signal according to the comparison signal.

9. The power converter of claim 8, wherein the control signal generator circuit comprises:

an AND gate configured to perform an AND operation on the comparison signal and an off-time control signal to generate a logic signal;

an on-time controller configured to generate an on-time control signal according to the logic signal;

an off-time controller configured to generate an off-time control signal according to the on-time control signal;

a delay circuit configured to delay the comparison signal to generate a delay signal; and a OR gate configured to perform an OR operation on the delay signal and the on-time control signal to generate the control signal.

10. The power converter of claim 1, wherein the power stage circuit comprises:

a third switch configured to receive the input signal and coupled to a node;

a fourth switch coupled between the node and a ground terminal, wherein the third switch and the fourth switch are controlled by the control signal; and a filter circuit coupled to the node and configured to output the output signal.

11. The power converter of claim 10, wherein when the control signal has a first logic level, the third switch is turned off and the fourth switch is turned on, and a voltage at the node is generated in response to the input signal, when the control signal has a second logic level, the third switch is turned on and the fourth switch is turned off, and the voltage at the node is generated in response to a ground voltage at the ground terminal.

12. A converting method, comprising:

generating, by a power stage circuit, an output signal according to an input signal and a control signal;

generating, by a ramp generator circuit, a ramp signal according to the control signal, the input signal, and the output signal, wherein the ramp generator circuit comprises a first impedance circuit coupled between an output node and a ramp generation node and a second impedance circuit coupled between an input node and the ramp generation node, wherein the ramp generator circuit further comprises a first switch and a second switch, the first switch is coupled between the first impedance circuit and the ramp generation node, and the second switch is coupled between the second impedance circuit and the ramp generation node or between the second impedance circuit and the input node; and generating, by a control circuit, the control signal according to the output signal, a reference signal, and the ramp signal.

13. The converting method of claim 12, further comprising:

receiving, by the first impedance circuit of the ramp generator circuit, the output signal from the output node; and receiving, by the second impedance circuit of the ramp generator circuit, the input signal from the input node, wherein the ramp signal is generated at the ramp generation node.

14. The converting method of claim 12, further comprising:

turning on the first switch and the second switch during a same time period.

15. The converting method of claim 12, further comprising:

controlling one of the first switch and the second switch by the control signal; and controlling the other by a complementary control signal, wherein the complementary control signal is a complementary of the control signal.

16. The converting method of claim 12, further comprising:

receiving, by a third switch in the power stage circuit, the input signal, wherein the third switch is coupled to a node;

controlling, by the control circuit, the third switch and a fourth switch in the power stage circuit, wherein the fourth switch is coupled between the node and a ground terminal; and outputting, by a filler circuit in the power stage circuit, the output signal, wherein the filler circuit is coupled to the node.

17. The converting method of claim 16, wherein when the control signal has a first logic level, the third switch is turned off and the fourth switch is turned on, and a voltage at the node is generated in response to the input signal, when the control signal has a second logic level, the third switch is turned on and the fourth switch is turned off, and the voltage at the node is generated in response to a ground voltage at the ground terminal.

* * * * *